V. E. EDWARDS.
WEIGHING SCALE.
APPLICATION FILED OCT. 5, 1908.

997,444.

Patented July 11, 1911.

Witnesses
Roy D. Tolman
Penelope Bombarbach

Inventor
Victor E. Edwards
By Rufus B. Fowler
Attorney

UNITED STATES PATENT OFFICE.

VICTOR E. EDWARDS, OF WORCESTER, MASSACHUSETTS, ASSIGNOR TO MORGAN CONSTRUCTION COMPANY, A CORPORATION OF MASSACHUSETTS.

WEIGHING-SCALE.

997,444.  Specification of Letters Patent.  Patented July 11, 1911.

Application filed October 5, 1908. Serial No. 456,144.

*To all whom it may concern:*

Be it known that I, VICTOR E. EDWARDS, a citizen of the United States, residing at Worcester, in the county of Worcester and Commonwealth of Massachusetts, have invented a new and useful Improvement in Weighing-Scales, of which the following is a specification accompanied by drawings forming a part of the same, in which—

Figure 1:
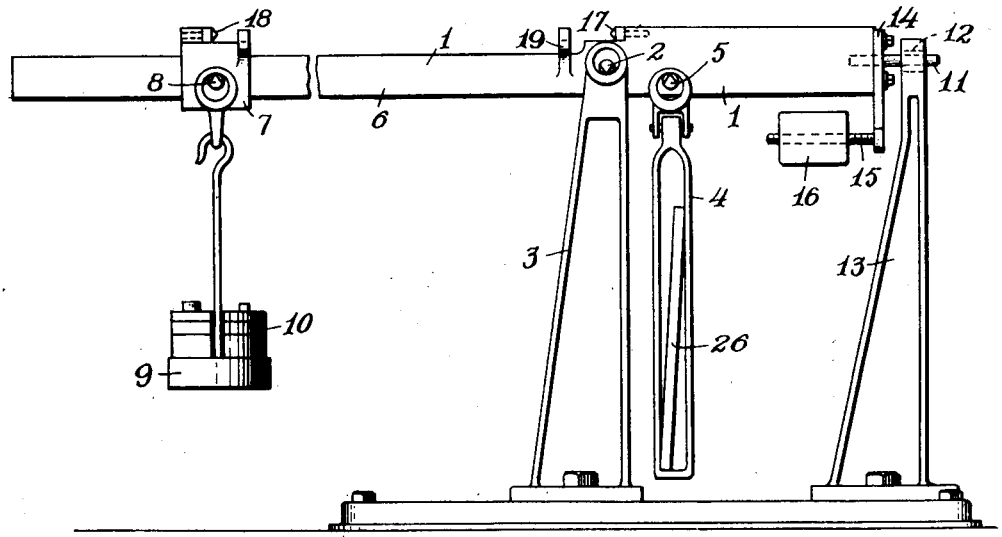
Figure 2:
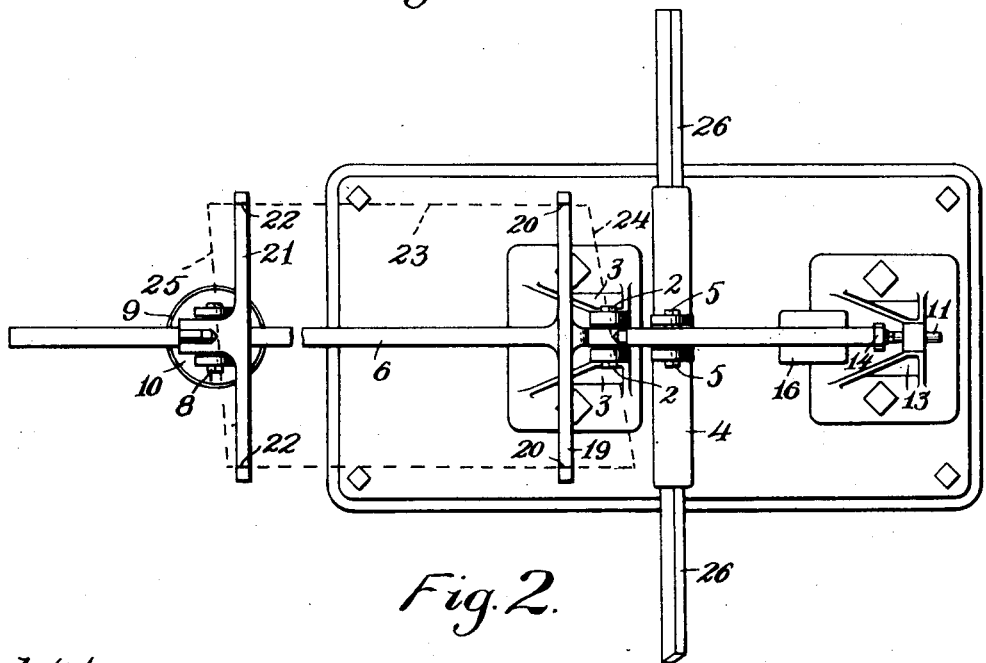

Figure 1 represents a side elevation. Fig. 2 a plan view of a weighing scale embodying my present invention.

Similar reference figures refer to similar parts in the different views.

The object of my present invention is to provide a weighing scale capable of automatically indicating any variation from the predetermined thickness of a plate of sheet metal as delivered from the rolls of a rolling mill by the weight of a sample of unknown length.

It is a common practice in rolling metal which is to be reduced to the form of thin sheets to secure the proper thickness of an initial plate or slab, of a given width, by weighing a sample of known length, and adjusting the rolls producing the sample until the desired thickness is secured as determined by the weight of the sample. By means of my improvement the variation in thickness from any predetermined standard for any unit of length of sample is automatically indicated by weighing a sample of unknown length.

The weighing scale embodying my invention, as illustrated in the accompanying drawings, comprises a horizontal scale beam 1 fulcrumed upon suitable knife edges 2 supported upon posts 3. Upon one side of the fulcrum 2 a scale pan 4 is suspended upon knife edges 5 projecting from the sides of the scale beam. The scale beam upon the opposite side of the fulcrum 2 consists of a long bar 6 adapted to receive a sliding head 7 provided with knife edges 8, having the line of their supporting edges coincident with the center of gravity of the sliding head 7. From the knife edges 8 is suspended a weight platform 9 adapted to support a series of variable weights 10. The swinging movement of the scale beam is preferably limited by means of a pin 11 carried by the end of the scale beam and working in a slot 12 in the post 13.

A yoke 14 is attached to the end of the scale beam to support a horizontal screw 15 which carries an adjustable counterbalance 16, capable of being adjusted on the screw 15 to cause the scale beam and scale pan 4 to accurately balance on the fulcrum 2 when the sliding head 7 has been removed from the bar 6. Above the scale beam are a pair of steel centers 17 and 18 lying in the same horizontal plane and vertically directly over the center of the scale beam. The steel center 17 is supported by the scale beam and has its point in a vertical plane passing through the bearing knife edge of the fulcrum 2. The steel center 18 is supported by the sliding head 7 and has its point in a vertical plane passing through the bearing edge of the knife edge 8. The scale beam is provided with a cross bar 19 having its ends turned upwardly forming shoulders 20, 20, equidistant from the center of the scale beam, with the distance between the shoulders 20, 20, equal to the width of the sample to be weighed. The sliding head 7 is provided with a similar cross bar 21 having at its ends similar shoulders 22, so that when the sample to be weighed is placed upon the cross bars 19 and 21, in the position shown by the broken lines 23, the contacting points between its two ends and the steel centers 17 and 18 will coincide with the longitudinal center line of the sample, so that in case the ends of the sample are cut obliquely to its sides, as indicated by the broken lines 24, 25, instead of at right angles thereto, the distance between the centers 17 and 18 will equal the average length of the sample.

In determining the thickness of any piece of indefinite length delivered from the rolling mill having a width equal to the distance between the shoulders 20, a sample of similar width and of known and correct thickness is placed in the scale pan 4. It is balanced by weights upon the platform 9, with the sliding head arranged at a distance from the fulcrum 2 equal to the length of the standard sample. The sample is then removed from the scale pan 4 and the piece of indefinite length, whose thickness is to be compared with that of the standard sample, is first placed upon the cross bars 19 and 21, between the shoulders 20, 20 and 22, 22 and with its ends in contact with the centers 17 and 18. The sliding head 7 is thereby arranged at a distance from the fulcrum 2 equal to the average length of the piece delivered from the rolling mill. It is then placed in the scale pan 4 and, if the thickness is correct, the weights upon the platform 9 will be exactly balanced, since the difference in length between the standard sample and the piece from the rolling mill is compensated for by the adjustment of the sliding head 7, as above described. By this means the thickness of the piece alone influences the tipping of the beam; if the piece be too thin, the weights will tip the scale beam raising the pin 11 and, if the piece be too thick, it will raise the weights and lower the pin 11. The comparative thickness of the standard sample and the piece from the rolling mill is thereby indicated and the rolls of the rolling mill may be adjusted as required.

I claim,

1. A weighing scale, comprising a fulcrumed beam provided with an abutting surface adapted to contact with one end of the article to be weighed, said abutting surface being arranged in the vertical plane of the fulcrum of said beam, a head slidable on said beam, and an abutting surface on said head adapted to contact with the opposite end of the article to be weighed, and arranged in a vertical plane coincident with the center of gravity of said head.

2. A weighing scale comprising a fulcrumed scale beam, a head slidable on said beam, a support transverse to said beam on said head for one end of the article to be weighed, and a parallel support of the same length on said beam for the opposite end of the article to be weighed, said last named support adjacent to the fulcrum of said beam.

3. A weighing scale comprising a fulcrumed beam, a head slidable on said beam arranged to support weights to balance the article to be weighed, a support on said head for one end of the article to be weighed, a support on said beam for the opposite end of the article to be weighed, said head also provided with an abutting surface in the vertical plane of the center of gravity of said weights and said beam provided with an opposing abutting surface in the vertical plane of said fulcrum, said abutting surfaces arranged to contact with the ends of articles to be weighed held in said supports and thereby determine the distance between said abutting surfaces.

4. A weighing scale, comprising a fulcrumed scale beam and a head slidable thereon, of means for supporting the article to be weighed in position to serve as a spacer between said slidable head and the vertical plane of the fulcrum of said scale beam, and means for determining the lateral position of the article to be weighed relatively to the longitudinal axis of the scale beam.

Dated this first day of October 1908.

VICTOR E. EDWARDS.

Witnesses:
PENELOPE COMBERBACH,
NELLIE WHALEN.

---

Copies of this patent may be obtained for five cents each, by addressing the "Commissioner of Patents, Washington, D. C."